(12) United States Patent
Kinjo (10) Patent No.: US 6,336,865 B1
(45) Date of Patent: Jan. 8, 2002

(54) GAME SCENE REPRODUCING MACHINE AND GAME SCENE REPRODUCING SYSTEM

(75) Inventor: Naoto Kinjo, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/624,162

(22) Filed: Jul. 24, 2000

(30) Foreign Application Priority Data

Jul. 23, 1999 (JP) .......................................... 11-209767

(51) Int. Cl.[7] ................................................ G06F 3/00
(52) U.S. Cl. ............................. 463/34; 463/30; 463/31; 463/32; 273/148 R; 273/148 B; 358/429; 358/1.8
(58) Field of Search ............................... 463/34, 30–31; 700/91–93; 348/552; 386/52, 45, 97, 46; 358/335, 429, 1.8, 342; 273/148 R, 148 B (56) References Cited

U.S. PATENT DOCUMENTS

| | | | | | |
|---|---|---|---|---|---|
| 4,811,239 A | * | 3/1989 | Tsao | ........................... | 358/429 |
| 5,175,804 A | * | 12/1992 | Wittman | ..................... | 358/1.8 |
| 5,537,217 A | * | 7/1996 | Kajita et al. | ................. | 358/342 |
| 5,621,536 A | * | 4/1997 | Kizu | ........................... | 386/52 |
| 5,703,997 A | * | 12/1997 | Kitamura et al. | ............. | 386/97 |
| 5,848,216 A | * | 12/1998 | Kaneshige | ................... | 386/46 |

* cited by examiner

Primary Examiner—Jessica J. Harrison
Assistant Examiner—Yveste G Cherubin
(74) Attorney, Agent, or Firm—Sughrue Mion, PLLC (57) ABSTRACT

The game scene reproducing machine includes a reproducing unit for reproducing a game scene of a game machine having an instruction unit for instructing output of the game scene while a game is being executed, and outputting game scene reproducing information is outputted, which includes game history information having timing information of output instruction, and control information and manipulation information of the game and a receiving unit for receiving the game scene reproducing information, wherein image data of the game scene that has been reproduced in accordance with the game history information, is outputted. The game scene reproducing system includes the game scene reproducing machine, the game machine or machines and a communication network in which the reproducing machine and the game machine or machines are connected. The reproducing machine and system are provided, which are capable of print-outputting, medium-outputting, or of on-line delivering an image or an image of high definition obtained by reproducing a game scene in a computer game machine while the game is being executed, and which also increases a property as an entertainment.

18 Claims, 3 Drawing Sheets

GAME SCENE REPRODUCING MACHINE AND GAME SCENE REPRODUCING SYSTEM

BACKGROUND OF THE INVENTION

The present invention relates to a technical field of a game scene reproducing machine and a game scene reproducing system. More specifically, the present invention is directed to a game reproducing machine and a game reproducing system which are capable of outputting an image, on which a scene of a game displayed on the display screen in a computer game machine etc. (sometime simply referred to as "game machine") is reproduced, preferably, in a high quality.

Some computer game machines (their game software, i.e. applications) provide a service for entirely or partly outputting a scene of a game (a game scene), which is displayed on a display screen of a display unit, while the game is being executed, as a print of a seal, a poster, and the like.

In the print service, an operator (player) of a game inputs his or her desire for outputting a print of a game scene image through a button or a command disposed on a game machine at the time the game scene is displayed while the game is being executed. This information is recorded in a memory included in a game cartridge or the like or in a dedicated memory. When the player, that is, the user delivers the memory to a print shop and requests to create a print therefrom, a print, on which the desired game scene is reproduced, is created and supplied to the user.

In the above print service of the game scene, it is contemplated to store the image data of the game scene in a memory as it is, and to output the image data as a print after it is subjected to predetermined processing steps.

It is, however, contemplated that a sufficient quality is recently obtained in an image of a game scene displayed on a display screen of the game machine so long as it is a display screen on a display unit. When the game scene is output as a print using the image data thereof, however, it can never be said that the print has a sufficient quality with respect to spatial resolution, density resolution, and the like. Further, since enlargement of an image carried out by image data processing inevitably deteriorates its quality, a print size also is restricted.

There also is contemplated a method of improving the quality itself of a game scene of a display screen. In this method, however, not only an amount of image data to be stored in a memory is greatly increased but also the image display capability of a game machine main body and game software must be extensively improved, which is very disadvantageous from a view point of cost.

SUMMARY OF THE INVENTION

Accordingly, a primary object of the present invention is to solve the problems inherent in the conventional art and to provide a game scene reproducing machine and a game scene reproducing system which are capable of outputting any arbitrary game scene while a game is being executed in a computer game machine as a piece of image or a plurality of images that are continuous (motion picture images or animation images), in particular, as a high quality image, or a motion picture image or an animation image of high definition, for example, as a print such as a photo print, a seal print, a poster, and an index print, or capable of outputting as an image data of such images to an image data recording medium, or transferring the image data via communication networks such as Internet.

A secondary object of the present invention is, in addition to the primary object thereof, to provide a game scene reproducing system capable of increasing amusements of users of a plurality of computer game machines that are connected to a game scene reproducing machine via communication networks such as Internet.

To achieve the above-mentioned primary object, according to a first aspect of the present invention, there is provided a game scene reproducing machine, comprising a reproducing unit for reproducing a game scene in a game machine having an instruction unit for instructing output of the game scene displayed on a display screen while a game is being executed, and outputting game scene reproducing information which includes game history information having timing information of a timing, at which an instruction of the output is instructed by the instruction unit, and control information and manipulation information of the game executed in the game machine, and a receiving unit for receiving the game scene reproducing information outputted from the game machine wherein the game scene that is instructed by the instruction unit to be outputted, is reproduced by the reproducing unit in accordance with the game history information received by the receiving unit, and image data of the game scene that has been reproduced, is outputted.

Preferably, the reproducing unit executes a game software for reproducing the game scene of the same game as the game that is executed by the game machine so that the game scene that has been instructed to be outputted, is reproduced.

Preferably, the image data of the game scene to be outputted is an image data of high definition image than an image data of the game scene that has been displayed on the display screen of the game machine.

Preferably, the image data of the high definition image is superior in at least one of spatial resolution, gradation resolution, and a number of drawn polygons as compared with those of the image data of the game screen of the game machine.

Preferably, the image data of the high definition image is an image data that has been subjected to the other image processing which is different from image processing executed in the game machine while the game is executed, and the other image processing is at least one of computer graphics technology selected from the group consisting of texture mapping, bump mapping, fogging, alpha rendering, bi-linear filtering, tri-linear filtering, MIP map, anti-aliasing, multi-pass rendering, radio city rendering, ray tracing, fractal, random fractal, fractal noise, cell automaton, Bezier curve, spline curve, NURBS.

Preferably, the image data of the game scene to be outputted is an image data subjected to at least one of special finishing processing and reproducing processing from a different view point.

Preferably, the game scene reproducing machine further comprises an image data converting unit for converting the image data of the game scene that has been reproduced, into an output image data in correspondence with an output format.

Preferably, the output format is at least one selected from the group consisting of a print output, recording to an image data recording medium and an image data transfer via a communication network.

Preferably, the game scene reproducing machine further comprises a comment information addition unit for adding comment information onto the image of the game scene to be outputted.

Preferably, the game scene reproducing information includes, in addition to the game history information, at least one selected from the group consisting of order information of the image of the game scene to be outputted, order person identification information and comment information, and the game machine outputs, in addition to the game history information, the game scene reproducing information that includes at least one selected form the group consisting of the order information of the image of the game scene to be outputted, the order person identification information, and the comment information.

Preferably, the game scene reproducing information that has been outputted by the game machine, is stored to a detachable memory that has been mounted or connected to the game machine, and the receiving unit is a unit for reading out the game scene reproducing information from the detachable memory.

Preferably, the receiving unit is connected to the game machine, or a memory that is built in, mounted or connected to the game machine via a communication network, the game machine directly outputs the game scene reproducing information to the communication network or outputs the game scene reproducing information to the communication network, after the game machine temporarily stores the game scene reproducing information to the memory that is built in, mounted or connected to the game machine, and the receiving unit receives the game scene reproducing information via the communication network.

According to a second aspect of the present invention, there is also provided a game scene reproducing system, comprising a game machine having an instruction unit for instructing output of a game scene displayed on a display screen while a game is being executed, and outputting game scene reproducing information, which includes game history information having timing information of a timing, at which an instruction of the output is instructed by the instruction unit, and control information and manipulation information of the game executed in the game machine, a game scene reproducing machine having a reproducing unit for reproducing the game scene in the game machine and a receiving unit for receiving the game scene reproducing information outputted from the game machine, in which the game scene that is instructed by the instruction unit to be outputted, is reproduced by the reproducing unit in accordance with the game history information received by the receiving unit, and image data of the game scene that has been reproduced, is outputted, and a communication network in which the game machine and the game scene reproducing machine are connected.

Preferably, the reproducing unit executes a game software for reproducing the game scene of the same game as the game that is executed by the game machine so that the game scene that has been instructed to be outputted, is reproduced.

To achieve the above-mentioned secondary object, according to a third aspect of the present invention, there is further provided a game scene reproducing system, comprising, a plurality of game machines each having an instruction unit for instructing output of a game scene displayed on a display screen while a game is being executed, and outputting game scene reproducing information which includes game history information having timing information of a timing, at which an instruction of the output is instructed by the instruction unit, and control information and manipulation information of the game executed in the game machine, a game scene reproducing machine having a reproducing unit for reproducing the game scene in at least one of the plurality of game machines and a receiving unit for receiving the game scene reproducing information outputted from the at least one of the plurality of game machines, in which the game scene that is instructed by the instruction unit to be outputted, is reproduced by the reproducing unit in accordance with the game history information received by the receiving unit, and image data of the game scene that has been reproduced, is outputted, and a communication network in which the plurality of game machines and the game scene reproducing machine are connected, wherein the at least one of the plurality of game machines outputs the game scene reproducing information of the game scene instructed by the instruction unit to the receiving unit of the game scene reproducing machine via the communication network.

Preferably, the reproducing unit executes a game software for reproducing the game scene of the same game as the game that is executed by the game machine so that the game scene that has been instructed to be outputted, is reproduced.

Preferably, the communication network is an interactive communication network, and the game scene reproducing machine outputs the image data of the game scene that has been reproduced by the game scene reproducing unit, to the plurality of game machines to be displayed on the display screen.

Preferably, the image data of the game scene that has been reproduced by the game scene reproducing machine is displayed as a reproduced image on the display screen of each of the plurality of game machines that specified members have, and the reproduced image is an assembled image representing at least one of a ranking and scoring of the specified members.

DETAILED DESCRIPTION OF THE INVENTION

A game scene reproducing machine and system of the present invention will be described below in detail in connection with preferred embodiments shown in the accompanying drawings.

With a game scene reproducing machine according to a first aspect of the present invention, an operator (player) of a computer game machine (hereinafter referred to as a game machine) selects, while playing a game, an image displayed on a display screen (game scene) from the game in progress at any time, and enters an instruction to output game scene reproducing information, specifically, to print a reproduced image of the game scene that may be selected by the player, and/or to obtain image data of the selected game scene (to acquire an image data recording medium in which the image data is stored, or to capture (or send) the image data through a communication network such as the Internet to other game machines or to computers owned by players of the other game machines). Upon the instruction, the game scene reproducing machine outputs the image data of the reproduced image in which the selected game scene (or a part of the scene selected arbitrarily) or continuous game scenes is/are reproduced. The game scene reproducing machine is thus suitably applied to a print system that uses such image data of a reproduced image to output a print of the image data, such as a seal print, a poster, a photo print, and an index print, or to output such image data of a reproduced image to an image data recording medium, or to transfer the image data through a communication network such as the Internet.

The print system as such is a system that can also function as a game scene reproducing system according to a second and a third aspect of the present invention.

In particular, the game scene reproducing system according to the third aspect of the present invention is composed of the game scene reproducing machine of the first aspect of the present invention and a plurality of computer game machines connected to the reproducing machine through a communication network such as the Internet. In this system, reproducing information of an arbitrary game scene taken from a game in progress on at least one game machine out of the plural computer game machines is output through the communication network to the game scene reproducing machine, and the game scene reproducing information obtained is used by the game scene reproducing machine to reproduce an image of the game scene, so that the reproduced image or an image obtained by applying various processing to the reproduced image is distributed to the plural game machines through the communication network.

Figure 1:
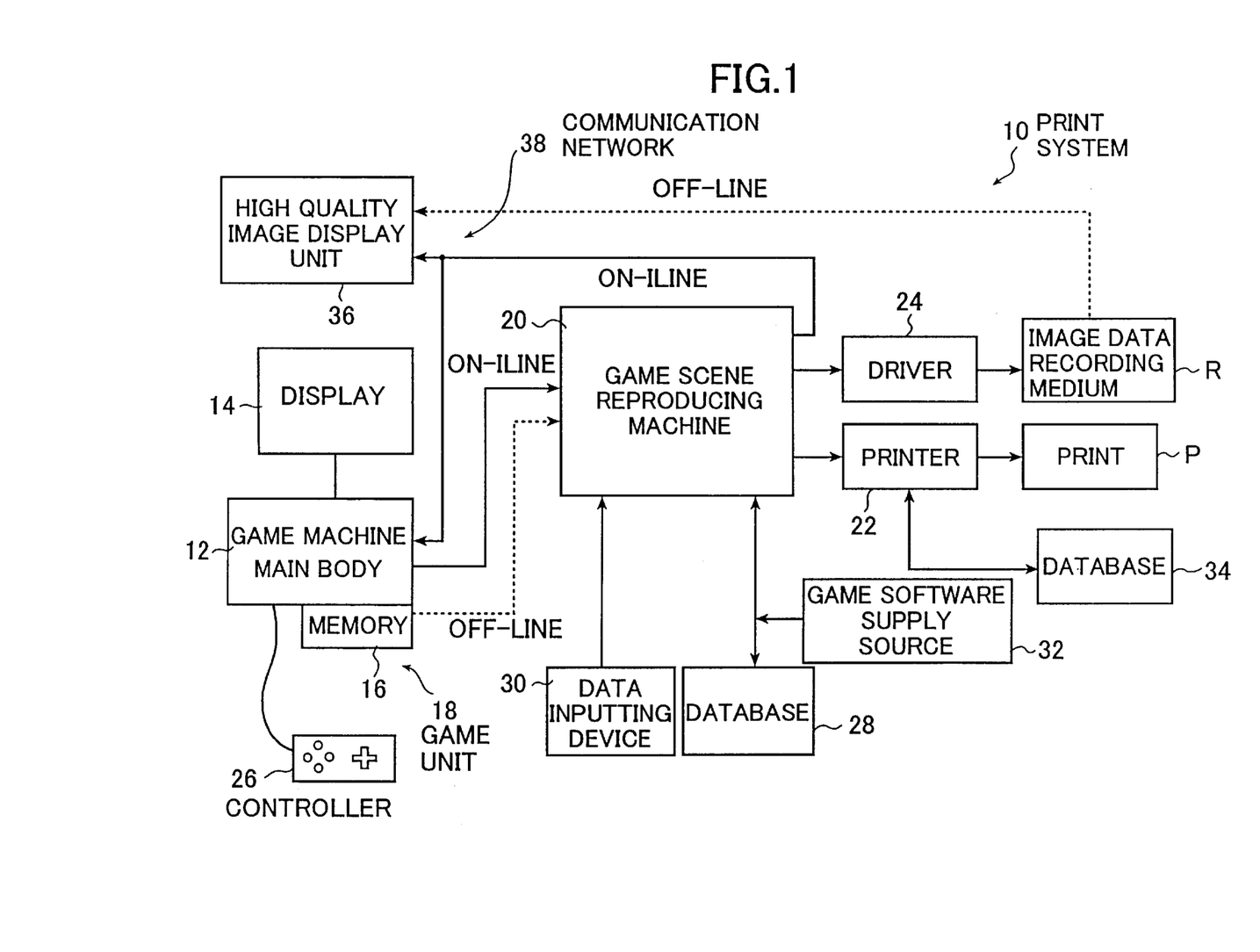
FIG. 1 is a conceptual block diagram of an embodiment of a print system functioning as a game scene reproducing system applying a game scene reproducing machine according to the present invention.

FIG. 1 is a conceptual block diagram showing an embodiment of a print system that functions as the game scene reproducing system according to the second aspect of the present invention using the game scene reproducing machine of the first aspect of the present invention.

A print system 10 shown in FIG. 1 includes a game unit 18 owned by a customer (client requesting to create a print, usually, game machine player), and composed of a game machine 12, a display 14 which displays a game scene on its display screen and which is connected to the game machine 12, and a memory 16 that is attached to (or connected to, or built in) the game machine 12, and a game scene reproducing machine (hereinafter referred to as a reproducing machine) 20 in a service trader including a laboratory (lab) or an image data distributor, a printer 22 connected to the reproducing machine 20 for outputting a print P, and a driver 24 of an image data recording medium R.

Connected to the game machine 12 is a controller 26 for playing a game, for operating a game by entering command to make game characters move and acts in certain ways, and for entering an instruction to output a game scene, or order information and comment information if necessary.

Connected to the reproducing machine 20 are a database 28 and a data inputting device 30, the database 28 storing software required to reproduce a game scene of a game played on the game machine 12, processing details about image processing and data processing performed on image data of a reproduced image of the outputted game scene, processing details about image data conversion in accordance with an output format of the reproduced image of the game scene, and comment information to be added to or composite with the outputted image data, and the data inputting device 30 inputting these contents from the external.

The reproducing machine 20 and the database 28 are connected to a game software supply source 32 from which the print service shop or the image data distributor may download a game software it does not possess, or a newly released game software.

A database 34 for storing various information such as data on the past print output and customer information is connected to the printer 22.

A customer may have, in addition to the game unit 18, a high quality image display unit 36 such as a personal computer for displaying a high quality image.

The game unit 18 (the game machine 12), the high quality image display unit 36, and the reproducing machine 20 are connected to one another via an on-line communication network (hereinafter simply referred to as a communication network) 38 such as the Internet.

In the print system making use of the present invention, the game machine 12 (game software executed in the game machine 12) has a function, in addition to an ordinary function for executing game, for permitting the player to instruct: an output of a game scene including a favorite image (scene) at any optional timing when the player's favorite image is displayed on the display unit 14 while the game is being executed; an output of the game scene as a print P, or an output as an image data recording medium R in which the image data is stored; or to obtain the image data via a communication network 38 such as Internet (hereinafter, generally referred to as "output instruction function"), and a function for storing a game scene reproducing information that includes at least the game history information of the game scene having instructed by a player so as to output in the game executed in the game machine 12 to the memory 16, or a function for directly delivering to the reproducing machine 20, after temporarily storing it to the memory 16 or via the network 38 from the game machine 12.

Output formats that the print system 10 utilizing the present invention shown in FIG. 1 can handle include print output in which the print P is outputted, medium output in which the image data recording medium R is outputted, an on-line output in which image data itself is outputted through the communication network 38, etc. An output instruction is made in accordance with the output format, i.e., one of an instruction of print output (print instruction), an instruction of medium output (medium instruction), and an instruction of on-line output (on-line instruction) is given to suite a desired output format.

With various kinds of output formats as described above, not only a still image in which one game scene is reproduced but also animation comprised of a plurality of reproduced images in which continuous game scenes are reproduced may be outputted. In the case of animation, preferable print output is an index print in which a plurality of images are reproduced in time-series on one print sheet.

In the case of a still image, a plurality of (game) scenes may be edited and printed as in index print or an album in any output format. In editing, no limitation is placed on the order of frames, the size, border patterns, and comment sections.

Needless to say, animation can also be edited in any output format. When reproducing the animation, it is further desirable that sound data during the game is also added after its quality has been enhanced in the reproducing machine 20.

Comment information may be added, regardless of output formats, to image data of a reproduced image in which a game scene instructed to output is reproduced. As an example of the comment information, comment information owned, prepared, or entered by a player who is a customer, and comment information prepared by a printing service shop or by an image data distributor (hereinafter generically referred to as service trader) having the reproducing machine 20 can be named.

Comment information provided by a customer is data the customer desired to add to a reproduced image, including text data (letter data such as a favorite word or phrase), image data such as a hand-written letter, photographed image data, favorite animation or motion picture and character image data taken from the animation, which are produced by the customer, and sound data. The comment data is either composite with the reproduced image or added to the reproduced image as an attachment. For instance in the case of a print, the data to be added may be composite with the reproduced image, or with an outside area of the reproduced image (the periphery thereof, e.g., white border), or may be recorded on the back of the print. Sound data is, if necessary, visualized, or converted into letter data or into image data for image composition or for attachment.

Comment information provided by a service trader also includes text data, image data of a still image and/or of animation, and sound data. Examples of data to be added, i.e., either composite or attached, are: data of a certain letter and an image, "Congratulations!" for instance, designed to mark a moment when a player conquers a specific scene of a game in progress; other text data and image data of advertisement provided by a service trader; player's achievement ranking data regarding conquest of a game or of a specific scene from the game which is created by referring to data accumulated in the database 28, for instance, "You are n-th member who has conquered this game!" or "You are ranked n-th!"; and data of a certificate mark intended to certify that a player has conquered a game or a specific scene from the game.

In the present invention, game scene reproducing information including game history information created in the game machine 12 is transferred from the game unit 18 to the reproducing machine 20 in various transfer modes. One transfer mode is that, as shown in FIG. 1 by the dotted line, the information is stored in a detachable and portable memory medium such as the memory 16 attached or connected to the game machine 12, and the memory 16 is detached from the game machine 12 to be physically carried to a place where the reproducing machine 20 is installed, for example, to a service trader (laboratory). Another transfer mode is that the information is once stored up in the memory 16 within the game machine 12 (which may be an internal memory, an external memory or a portable memory as mentioned above), and then is transferred at a given period via the communication network 38 illustrated by the solid line in FIG. 1. Alternatively, the game scene reproducing information created in the game machine 12 may be instantly transferred via the communication network 38.

However, the present invention may not be provided with all of these output formats and transfer modes, and it is sufficient if the invention can handle at least one of the above output formats and at least one of the above transfer modes.

In a game scene reproducing machine according to the most basic concept of the present invention, the output format is print output by a print instruction where a print P is simply a reproduced image of a game scene instructed to print, the transfer mode is off-line transfer where a portable memory is used as the memory 16 so that the information stored therein can be carried physically, and the game scene reproducing information is game history information. The game scene reproducing machine is a game scene reproducing system that is composed of the reproducing machine 20, the game unit 18, and the printer 22 in FIG. 1. However, the present invention is of course not limited to the machine or the system.

Note that the output instruction such as a print instruction in accordance with an output format may be inputted by a command with a controller 26. Further, the output instruction may be executed through a dedicated button or the like disposed on the game machine 12 itself or the controller 26. Otherwise, an inputting device may be provided to the game machine 12 so as to input a command with the inputting device, or directly instruct the output.

Further, the number of times of output instruction such as a print instruction is not limited to once (that is, one game scene), but it may be executed any desired times in accordance with the capacity etc. of the memory 16, at any optional timings while the game is being executed. In addition, it may execute the output instruction for a plurality of game scene or a plurality of continuous game scene (for example, continuous still images, or motion picture or animation) by a single output instruction.

The game machine 12 may have, in addition to the output instruction function, a function for inputting an instruction of the output format, order information to specify details of the output format, and comment information to be attached to or composite with a print or image data, so that the order information and the comment information corresponding to an output format may be inputted together with the output instruction information such as a print instruction, or may be recorded in the memory 16. These order information and the comment information are inputted or recorded using the controller 26 or a not-shown inputting device, and the timing thereof may be during a game is played or executed, or after the game is ended, or both. The order information is preferably outputted as the game scene reproducing information together with the game history information outputted from the game machine 12 in response to an output instruction.

There is no particular limitation put on the order information as long as it specifies the output format and details thereof. The order information follows the specified output format. In the case of the print output, for instance, the order information includes the size of each printed material, the number thereof, the paper quality, finishing conditions, how the customer receives the finished print, and a payment method. The order information includes the type of the image data recording medium if the medium output is specified, one or more address to which the data is transferred if the on-line output is specified, and for both the medium output and the on-line output, data format, data size, data compression level are included. The order information common to all the output formats are customer information (identification (ID) information especially if it is on-line output), information for specifying the type and the content of data processing such as image processing and special finish, and various kinds of option instruction information.

As for the game scene reproducing information employed in the present invention, it is preferable that the information includes a game history information of a game scene instructed by a player to output, order information or comment information from a player, but is not limited thereto. Any information is preferable as long as it at least includes information with which the game scene instructed with the game machine 12 may be reproduced, for instance, the information may at least include the game history information.

Such game history information is information for reproducing a game scene that has been instructed to be outputted, by means of the game software for reproducing the game scene of the same game contained in the game reproducing machine 20 which will be described later. The game history information is composed of, for example, timing information of timings at which the player instructs the output (sequential timing at which an instruction of output is instructed while the game is being executed), control information, that is, internal control information in the game (setting of scenes, generated data, and the like), manipulation information, that is, the time-sequential information of manipulation executed by the player while the game is being executed, and the like.

Note that it is not necessary to store history information covering all the proceedings of a game for the creation of reproduced image such as print creation, a creation of an image data recording medium, or on-line output of the image data and information, it may only include information such as an editing data with which the game scene that has be instructed by the game machine 12 can be reproduced. Information (data) that is not necessary to the reproduction of the game scene, the output of which has been instructed, may be successively deleted.

In the print system 10 making use of the present invention, the memory 16, which is mounted on the game machine 12, is not particularly limited, and various types of known recording mediums such as a floppy disc (FD), a hard disc (HD), a flash memory, an IC memory, an MO, a CD-R, a DVD, and the like can be used. Further, when the game machine 12 is of a type which executes game through a game cassette (cartridge) or the like, which is mounted thereon and in which a ROM or the like for storing game software is included, the memory 16 may be incorporated in the game cassette. In addition, in the case where the game scene reproducing information recorded in the memory 16 is transferred to the reproducing machine 20 by means of off-line, the memory 16 should be a conveyable memory that is detachable. Therefore, as the memory 16, an external memory that is a type to be mounted to the game machine or to be connected thereto is preferable. However, in case of on-line transfer mode, either of an internal memory such as built-in memory or an external memory fixingly attached to the game machine may be adopted as the memory 16.

The display unit 14 may be dedicated for the game machine 12 or may be a monitor of a computer etc. or a television for use at home.

In the print system 10, in the case where the transfer mode is an off-line, the memory 16, in which the game scene reproducing information including the game history information is stored, is removed from the game machine 12, delivered to a print service shop by a customer together with a request for creation of a print or for a medium output, and mounted on the reproducing machine 20 of the print service shop. The order information or the comment information such as the number of the prints described above and the various types of the options may be instructed to the print service shop orally or by being written on a request sheet when the customer requests the creation of the print, in addition to that it is recorded as the game scene reproducing information together with the game history information in the memory 16. Further, both of the methods of instruction may be used at the same time.

Note that the present invention is not limited to the arrangement that the memory 16 is removed from the game machine 12 and delivered to the print service shop, and the game scene reproducing information once stored in the memory 16 may be supplied to the print service shop through the on-line communication network 38 such as a computer communication or the like. In addition, without storing in the memory 16, the game scene reproducing information may be transferred directly to the reproducing machine 20 from the machine 12.

The game reproducing machine 20 of the present invention includes the game software for the reproduction of the game scene of the same games as those owned by the customer. Accordingly, for example, by reading out the game scene reproducing information including the game history information from the memory 16 mounted thereon, or by reading in the game scene reproducing information that has been on-line transferred, the game software for the reproduction of the game scene of the game is started, the print of which has been requested. By using the reproducing game software and the game history information, a game scene the print of which has been instructed is reproduced to output an image data in accordance with an output format such as the print P.

Figure 2:
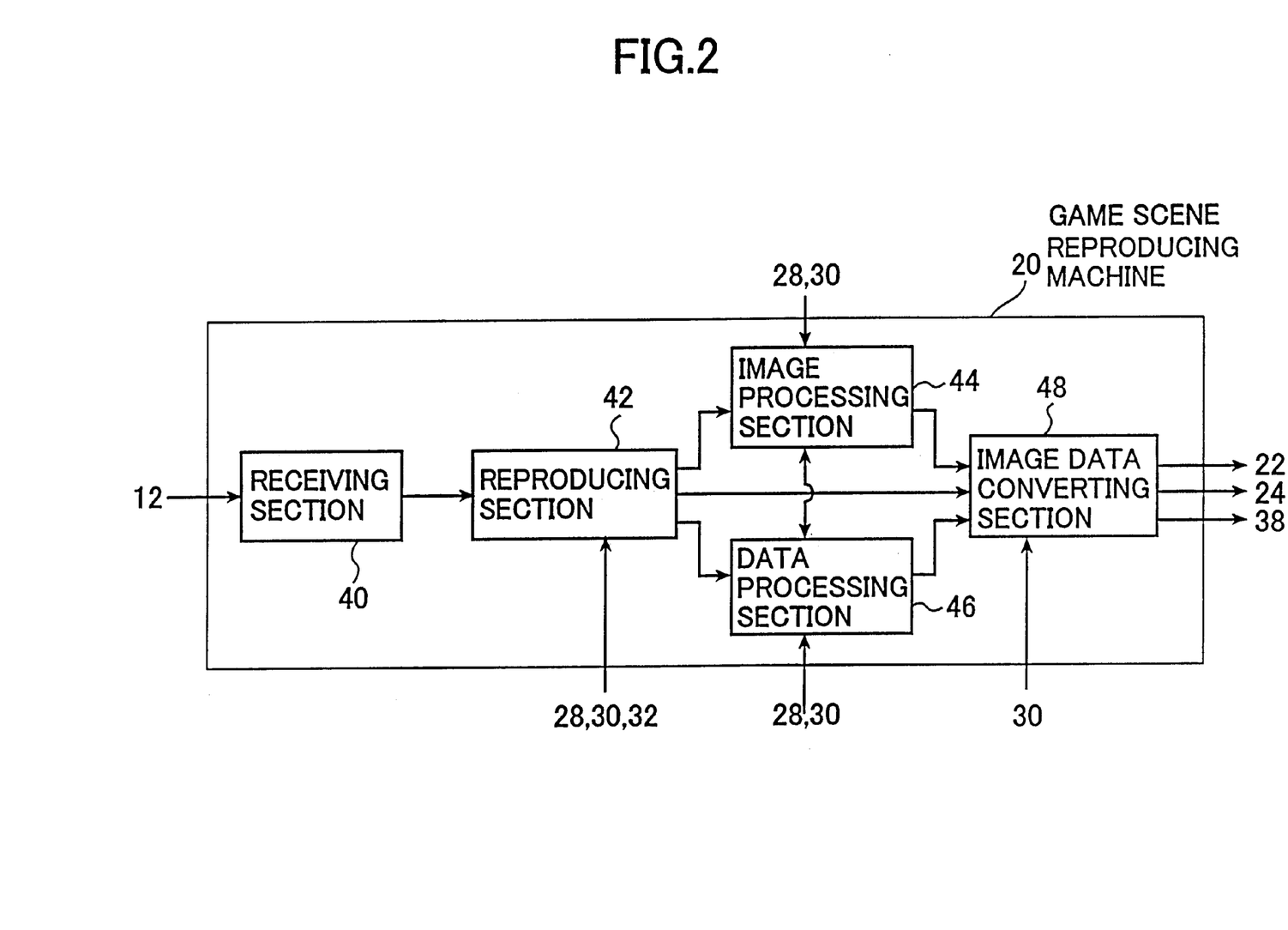
FIG. 2 is a conceptual block diagram of an embodiment of the game scene reproducing machine shown in FIG. 1.

As shown in FIG. 2, the reproducing machine 20 of the present invention comprises a receiving section 40 for reading out game scene reproducing information from the memory 16 attached thereto, or for receiving game scene reproducing information transferred from the game machine 12 (or from the memory 16 of the game machine 12) via the on-line communication network 38 to capture this information; a reproducing section 42 for reproducing a game scene instructed to output by executing software for reproducing the game scene of the same game (hereinafter referred to as reproducing game software) as instructed to output on the basis of the output instruction information contained in the game scene reproducing information and by using game history information, and for creating image data of a reproduced image or scene-constituting data (e.g. data for polygonal mirror); an image processing section 44 for performing a given image processing on the image data of the reproduced image; a data processing section 46 for performing, on the image data before or after the image processing, data processing such as special finish processing and reproducing processing from a different point of view; and an image data converting section 48 for converting the image data after the image processing or after the data processing into image data in accordance with an output format.

The reproducing game software owned by the reproducing section 42 of the reproducing machine 20, or executed in order to reproduce a game scene is not limited to one. That is, the reproducing section 42 may have a plurality of reproducing game software, or a plurality of reproducing game software may be executed, of course. The reproducing game software as such may be one stored in a memory, such as a hard disk, owned by the reproducing machine 20, or one stored in the database 28 connected to the reproducing machine 20, or one stored in a storing medium, such as a CD-ROM, an MO (magnetoptical recording medium), an FD, a removable HD, that can be loaded into the data inputting device 30 of the reproducing machine 20, for instance, a storing medium driver.

In the case where the reproducing game software is game software neither the reproducing section 42 nor the database 28 has, or is game software that is not recorded in the recording medium to be loaded into the data inputting device 30, the reproducing game software may be downloaded from the game software supply 32 via a communication network 38 such as the Internet on the basis of game identification information of the game history information contained in the game scene reproducing information. The game software supply source 32 may be, for example, a database of a game maker of the game of interest or a database of an organization providing games. A game software stored in the database 24 that is connected to the printer 22 may also be utilized as the reproducing game software. The above various methods may of course be used together.

While the game software executed by the game machine 12 of the customer and the reproducing game software executed by the reproducing section 42 of the game reproducing machine 20 are the game software of the same game, the former game software is not necessarily completely the same as the latter game software. That is, particularly as to a display image of a game scene, the reproducing game software executed by the reproducing section 42 of the game reproducing machine 20 preferably has a capability for outputting the image data of the image of high quality or scene-constituting data so as to be able to reproduce the image of high definition compared to the game machine 12.

Specifically, the reproducing game software executed by the reproducing section 42 of the game reproducing machine 20 can output the image data of an image at least one and preferably all of the spatial resolution, density resolution and a number of drawn polygons of which are superior to those of the game software executed by the game machine 12.

Further, in the case where the reproducing game software is executed by the reproducing section 42, the game scene that has been instructed to be outputted by the customer, may only be reproduced. Accordingly, it is not necessarily need to execute the game software from the initial to reproduce the advancement of the game faithfully. The reproduction of the game software may be started from the part of the way.

Further, the image processing unit 44 may execute image processing which is not executed in the game machine 12 or may execute the image processing executed in the game machine 12 to a high degree.

Exemplified as the image processing are CG (computer graphics) technologies such as texture mapping, bump mapping, fogging, alpha rendering, bi-linear filtering, tri-linear filtering, MIP map, anti-aliasing, multi-pass rendering, radio city rendering, ray tracing, fractal, random fractal, fractal noise, cell automaton, various methods of creating a freely curved surface (Bezier curve, spline curve NURBS, and the like).

Since it is not necessary for the reproducing unit 42 to display an image of a game scene in real-time according to the execution of game, the image processing unit 44 has a sufficient time to be spent for arithmetic operation, and an amount of image data to be processed. Accordingly, the image processing unit 44 can perform image processing to a high degree in accordance with high spatial resolution, high density resolution and a large number of drawn polygons. The reproducing machine 20 thus can satisfactory handle creation and processing of image data of high image quality for reproducing a high quality image.

Further, in the game reproducing machine 20 according to the present invention, not only image processing for reproducing high quality image by the image processing section 44 but also image processing designated by the player or at the player's choice by the data processing section 46 may be carried out. Such image processing by the data processing section 46 includes image processing for special finishing (processing for special finishing) and reproducing processing from a different point of view.

Processing for special finishing includes finishing in a style of an oil painting, in a style of a watercolor painting, in a style of a drawing in Indian ink, and in a style of a scene in an animated cartoon, monochrome, sepia, or any other particular color tone finishing, shading processing, light beam processing for setting the direction, intensity, and the like of the light, change of the background with a main subject remaining the same, and displacement using a completely different background or an image designated by the customer. These kinds of processing may be carried out in a conventional way.

Further, as reproducing processing observed from a different point of view, there is enumerated a method in which a game scene which has been instructed by a known method to be outputted, is scrolled, for example, in a lateral direction, to thereby produce a game image (scene) observed from a different point of view. Thus, the image that is changed in its point of view in accordance with an instruction of the customer, can be reproduced. In addition, such a reproducing operation observed from a different point of view as described above includes the processing such as magnification, reduction or trimming. As a result, an image of the game scene that cannot be viewed with the game machine 12, can be outputted.

Furthermore, another reproducing processing observed from a different point of view includes a method of creating, as a three-dimensional (3D) image, a stereo image that is an image from the point of view corresponding to each eye. This 3D image is possible when a character, background or the like in the game executed in the game machine 12 is represented as 3D data. When the game scene is represented in the 3D space, an image from a freely moved point of view in the 3D space of the game scene including, for example, the scene viewed from the reverse side of the character can be created.

Here, designation of the content of the processing in the image processing section 44 and in the data processing section 46 may be included in advance in the order information of the game scene reproducing information on the side of the player, may be accumulated in the data base 28 with regard to each customer (player) on the side of the service trader (provider), or may be carried out through the data inputting device 30 whenever necessary or in advance.

It is to be noted that, though the reproducing machine 20 in the illustrated embodiment has both the image processing section 44 and the data processing section 46, the present invention is not limited thereto, and the reproducing machine 20 may have either one of these, or, may have neither and reproduced image data of a game scene reproduced by the reproducing section 42 may be directly outputted to the image data converting section 48. It is to be noted that, in case both the processing by the image processing section 44 and the processing by the data processing section 46 are carried out, it does not matter which one is the first.

The reproduced image data reproduced by the reproducing section 42, the reproduced image data processed by the image processing section 44, or the reproduced image data processed by the data processing section 46 is converted into output image data according to the output format (the format, the size, and the like) by the image data converting section 48. More specifically, in case the data is outputted through the printer 22, it is converted into output image data for a print which is adapted for the printer 22. In case the data is outputted through the driver 24, it is converted into output image data adapted for the image data recording medium R to be used. In case the data is outputted on-line, it is converted into output image data adapted for the network 38.

It is to be noted that, in case only one or two of the output formats are set, it is enough that the image data converting section 48 can convert the data into the output image data according to the set output format(s). It is to be noted that, in case the reproduced image data inputted to the image data converting section 48 is output image data according to the output format, image data conversion is not necessary. In case only one of the output formats is set, the image data converting section 48 itself is not necessary.

It is to be noted that designation of the output format to the image data converting section 48 may be carried out through the order information of the game scene reproducing information on the side of the player, or, may be carried out through the data inputting device 30 on the side of the service trader.

In the case of a print output, the game scene reproduced by the reproducing machine 20 is thus used as an output image data from which the printer 22 creates a print and is outputted to the printer 22.

The printer 22 is a known printer, and subjects image data supplied thereto to predetermined processing such as gradation adjustment, color/density adjustment, and the like, to output as a pint (hard copy).

Figure 3:
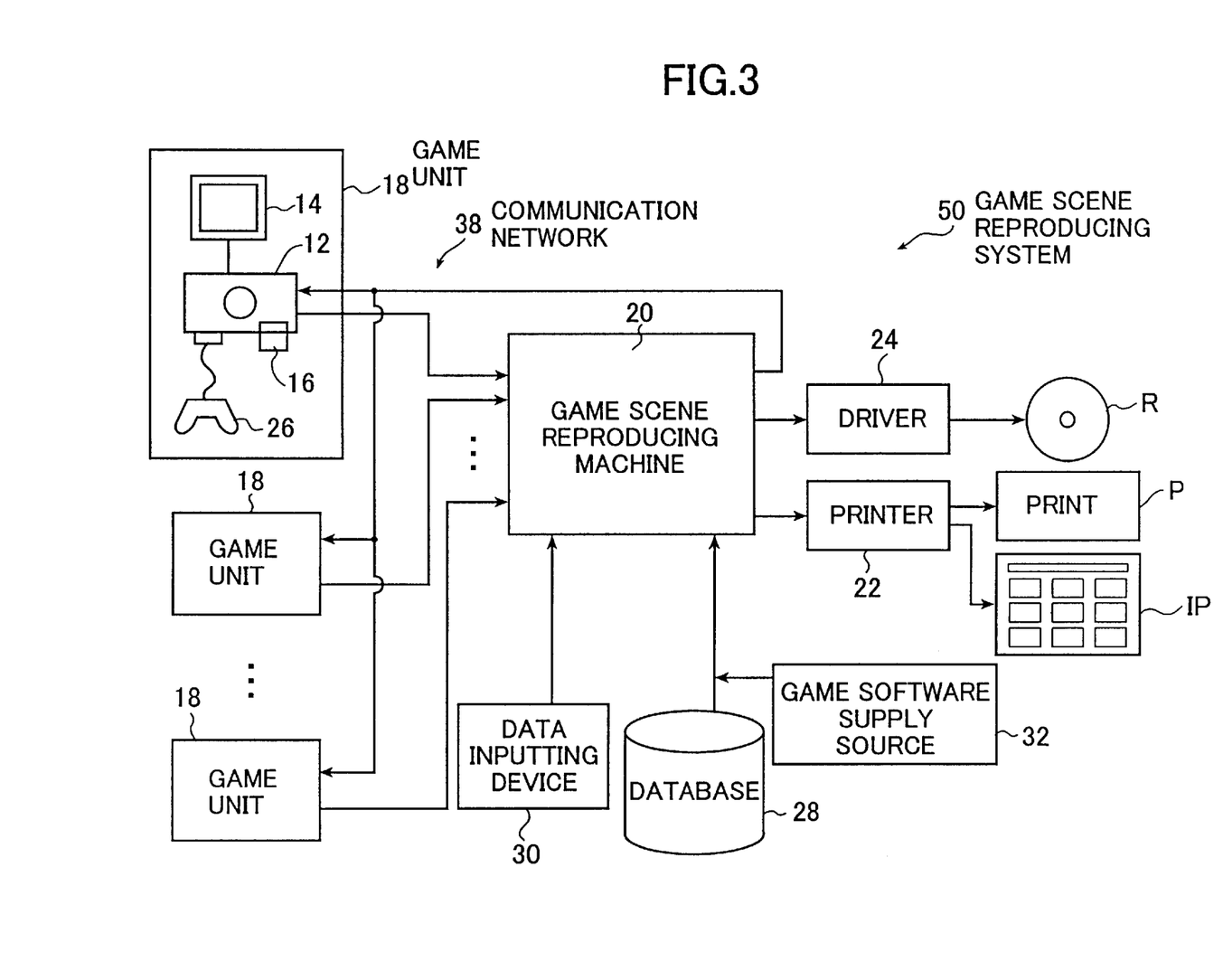
FIG. 3 is a conceptual block diagram of an embodiment of the game scene reproducing system according to the present invention.

Further, as described above, in the case where a plurality of print instructions are executed for a game scene or an animation (motion picture) of the game scene, as shown in FIG. 3, an image of an index print IP, which collects those scenes into a single print, may be produced. Note that the image of the index print IP (image data) may be produced by the printer 22. The index print IP shown in FIG. 3 has the plurality of images as well as comment information described in the above of the images.

In the print system 10 making use of the present invention, the printer 22 is not particularly limited, and various types of known color printers can be used. Exemplified as the printer 22 are, for example, a printer for developing a photosensitive material (photosensitive thermally-developing material) by scanning and exposing it with a laser beam, an electrophotographic printer, an inkjet printer, a thermal head printer, a heat mode laser printer, a thermal transfer printer, and the like.

In case of output to a medium, the game scene reproduced by the reproducing machine 20 is made to be the output image data for an image data recording medium to be outputted through the driver 24 in this way.

The driver 24 is a conventional driver for an image data recording medium for recording the output image data onto the image data recording medium R and outputs the image data recording medium R. The image data recording medium R is transported off-line to the high quality image display unit 36 on the side of the customer, and is loaded in a built-in driver which is not shown. The output image data which is read out is displayed as a high quality image.

The image data recording medium R as used in the present invention is not specifically limited, and may include conventional image data recording media and the like such as a floppy disk (FD), a removable hard disk (HD), an MO, a CD-R, a DVD, an IC memory, a Smart Media, and a ZIP.

In case of on-line output, the reproduced image data of the game scene reproduced by the reproducing machine 20 is made to be the output image data for on-line communication to be outputted through the communication network 38.

The communication network 38 is a conventional distribution network for distributing the output image data to the high quality image display unit 36 or the game unit 18 connected to the network. The high quality image display unit 36 or the game unit 18 capable of displaying a high quality image displays the output image data as a high quality image. It is to be noted that, in the game machine 12 of the game unit 18, during a game is executed, the speed of the motion of a character and the like in the game scene, that is, the speed of the motion as a dynamic image and the like are regarded as important and the quality of the displayed image is not enhanced. In case it displays the output image data distributed from the reproducing machine 20, it is preferable that a high quality image is displayed with enhanced spatial resolution, density resolution, resolution, pixel density, and the like. In this way, a high quality image is enjoyed also with the game machine 12.

As described above, in the print system 10 making use of the present invention, an output image data outputted from the reproducing machine 20 is not produced from an image data of an image itself of a game scene displayed of the display 14 of the game machine 12. The game scene that has been instructed by the game machine to be outputted, is reproduced by the reproducing machine 20 using a reproducing game software of the same game, thereby being an image of high definition, that is, an image data of an image of high quality.

Therefore, the player can give output instruction such as instruction to print an arbitrary game scene without any limitation. Further, as described in the above, since the print P can be outputted using image data having much higher image quality compared with that of an image displayed on the display 14 of the game machine 12, a print having higher image quality can be outputted compared with a conventional print service of a game image. Still further, since image data having high image quality can be recorded on the image data recording medium R or can be distributed through the on-line communication network 38, and using them, can be displayed on the high quality image display unit 36 or the game unit 18, a high quality image can be displayed. Further, in a printed image or a displayed image, the degree of freedom in various kinds of processing such as expanding and change of the point of view can be greatly improved.

In addition, since a game scene the output instruction of which is given by the game machine 12 is reproduced by the reproducing machine 20 not using the image data itself but using the game history information of the game scene reproducing information, the amount of data to be stored in the memory 16 and the amount of data to be transferred through the on-line communication network 38 can be decreased. Therefore, in case of the off-line transferring mode, the memory 16 is not required to store the image data itself, and the amount of data can be decreased accordingly. For example, output instruction such as instruction to print game scenes the number of which is larger than that in a conventional case can be stored in one memory 16 to make a request for forming the print P, forming the image data recording medium R, or on-line distribution of the output image data.

In case of the off-line transferring mode, time necessary for transferring one game scene can be greatly shortened.

In particular, in case the output format is a print, as described in the above, the outputted print P is not limited to an ordinary print. It may be a seal print, a post card, a calendar, a poster, or a print to a three-dimensional object (such as a shirt and a cup).

Further, the image may be outputted as a three-dimensional (3D) print. For example, assumed images from different points of view such as an image for the right eye and an image for the left eye may be formed and outputted, or the image may be outputted as a three-dimensional print having lenticular lenses on the surface of the print.

The database 34 is connected to the printer 22 of the illustrated print system 10 and various kinds of information is stored therein so as to cope with various options.

For example, a print may be created in such a manner that the image data of the face of a customer is stored in advance in the database 34, the image data is supplied to the printer 22 when the print is to be created, and the face of the customer is composite with the background of a game screen image or the like in the printer 22, or the face of a game character is replaced with the face of the customer in the printer 22. Further, the image of a character and the image of a scene which were contained in a game image printed in the past are stored and a print on which these images are composite may be outputted. Furthermore, it is possible to composite an image with a character and a scene of another game on a print.

Note that the above processing steps such as the composite of images, and the like may be carried out by the image processing unit 44 and/or the data processing unit 46 of the game reproducing machine 20 to which the database 34 is connected. In addition, the processing steps may be carried out using the printer 22 and the game reproducing machine 20 at the same time.

The game scene reproducing machine of the first aspect of the present invention and the game scene reproducing system of the second aspect of the present invention are, basically structured as above.

Next, a game scene reproducing system as a third embodiment of the present invention is described with reference to FIG. 3.

The game scene reproducing system (hereinafter referred to as the reproducing system) 50 shown in FIG. 3 is identical to the print system 10 shown in FIG. 1 except that a plurality of game units 18 are connected to the reproducing machine 20 through the on-line communication (hereinafter referred to as network) network 38. Like reference numerals designate like elements and detailed description thereof is omitted.

In the reproducing system 50 shown in FIG. 3, the game machines 12 of the respective game units 18 of a plurality of players are connected through the network 38 such as the Internet. Here, the plurality of players connected through the network 38 are preferably members who have been registered in advance. It is to be noted that, preferably, the network 38 is a two-way network, and two-way communication is possible between the game machines 12 of the plurality of game units 18 and the reproducing machine 20.

In the reproducing system 50 shown in FIG. 3, first, when at least one of the plurality of players clears or conquers predetermined conditions, the game scene reproducing information including the game history information the output of which is designated by the game machine 12 of the game unit 18 of the player, and, if necessary, the game scene reproducing information of the game scenes of other players at the time of the clear, are transferred through the network 38 to the reproducing machine 20.

Then, based on the output designation information and the game history information of the game scene reproducing information of a plurality of players including the at least one player and other players, the reproducing machine 20 reproduces game scenes of the plurality of players into one composite reproduced image. The obtained composite reproduced image is, if necessary, subject to image processing and/or data processing, and the image data of the composite reproduced image is outputted according to the output format. The print P of the composite reproduced image is outputted from the printer 22, the image data recording medium R with the image data of the composite reproduced image recorded thereon is outputted from the driver 24, or the data is distributed through the network 38 to the game machines 12 or display units which are not shown of the game units 18 of the plurality of players. Here, it is preferable that the outputted composite reproduced image and the image data thereof are an image having higher quality than that of an image displayed on the game machines 12 and the image data thereof.

Alternatively, based on the output designation information and the game history information of the game scene reproducing information of at least one player, the reproducing machine 20 reproduces the game scene of the one player or reproduces game scenes of two or more players into one composite reproduced image. The obtained reproduced image is, if necessary, subject to image processing and/or data processing. The image data of the reproduced image is distributed to the respective game machines 12 of the game units 18 of the plurality of players. After that, the respective game machines 12 of the game units 18 of the plurality of players which received the image data of the reproduced image display the reproduced image on the respective displays 14.

The reproduced image formed in the reproducing system 50 may be formed based on the game scene reproducing information of one player, or may be formed of a composite reproduced image which is reproduced based on the game scene reproducing information of a plurality of players.

First, a case where a composite reproduced image of game scenes of members who have registered in advance is formed is described specifically.

Here, it is preferable that the predetermined condition information which indicates what kind of game stage is cleared in the game scene has been set in advance as group register information.

First, according to a first method, the respective players at discretion execute the same game on the respective game machines 12. The game scene reproducing information of the game scene at the time when the predetermined conditions which have been determined within the group are satisfied (scene edition data) is transferred to the reproducing machine 20 of the service trader such as the laboratory, the image data service trader or the like. The service trader executes the information forming processing (reproduction, composition, or the like) when the scene edition data with regard to all the predetermined members are obtained.

In an image formed in this way, for example, in a game scene after a predetermined stage is cleared in the game, there may be images sorted according to the elapsed time and the score. It is to be noted that the sorted images may include images of the faces of the respective members who have been registered in advance or composite face images. Further, processing to embed the faces of the members as characters in the game may also be applied.

Next, according to a second method, a collection image of the game scenes of the respective members at a predetermined timing is formed. In this method, the respective members play the same game on the game machines 12 synchronously. The scene edition data of the game machines 12 of the respective players continue to be transferred to the service trader all the time. Here, an image is formed where the game scenes of all the members are gathered up at the time when one of the members clears the game or clears a predetermined stage of the game.

It is to be noted that, in this case, the scene edition data is not necessarily required to be transferred to the service trader on a real-time basis, and, the scene edition data until the respective members clear the game or clear the predetermined stage of the game may be acquired to form data with the timing when (the elapsed time until) the earliest player cleared being the standard. Further, sorting similar to the above-mentioned may be carried out.

According to a third method, the results such as the number of times the members won the title and the total (accumulated) score are accumulated in the database 28 on the side of the service trader as data for the group. The data may be read out of the database 28 when an image is formed to carry out composition of the results such as the number of times the members won the title and the total score with regard to the formed image.

A composite reproduced image or a collection image formed in this way is outputted as the print P from the printer 22, outputted as the image data recording medium R with the image data recorded thereon from the driver 24, or distributed as the image data thereof through the network 38 to be displayed on the display 14 of the game machines 12 or the display units which are not shown.

In this way, in the reproducing system 50, since a collection image clarifying the ranking, the scoring or the results of the members can be formed, the players as the members can enjoy improved entertainingness.

It is to be noted that, in case the game machines 12 of the game units 18 of a plurality of the members are connected to the reproducing machine 20 through the two-way network 38, it is preferable that a reproduced image formed on the side of the service trader such as the laboratory or the like is transmitted to the respective members at predetermined timing such as at the time when one of the members clears a predetermined stage.

For example, at the time when one player in the members first clears the game or a predetermined stage of the game, the player transmits the game scene reproducing information through the network 38 to the reproducing machine 20 of the service trader. The reproducing machine 20 reproduces the game scene based on the transmitted game scene reproducing information, and transmits the image data of the reproduced image of the game scene through the network 38 to the game machines 12 of the game units 18 of the respective members. The game machines 12 of the respective members display on the displays 14 the reproduced image based on the transmitted image data.

In this way, with the reproducing system 50, rivalry in the respective players is aroused and thus, improved entertainingness can be enjoyed.

While the game scene reproducing machine and the system of the present invention has been described above in detail, the present invention is by no means limited to the above embodiments and it goes without saying that various improvements and modifications can be made within the range which does not depart from the gist of the present invention.

As described above in detail, according to the game scene reproducing machine of the first aspect of the present invention, and the game scene reproducing system of the second aspect of the present invention, it is possible to output a print of a reproduced image of any game scene of a game executed in various kinds of game machines, to output an image data recording medium in which image data of the reproduced image is recorded, and to distribute online the image data. Further, a reproduced image displayed on the basis of the reproduced image on the outputted print, the image data recorded in the image recording medium, and the image data distributed online, is superior in image quality to an image obtained by a conventional print service of a game scene as well as a degree of freedom of the processing steps of print can be increased. Moreover, an amount of data, which is to be stored in a memory, or an amount of data, which is to be sent via the communication network, for print output of a game scene, medium output of image data of the game scene, and online output thereof, can be reduced as compared with a method of storing image data. Therefore, time required to transfer data corresponding one scene of a game can be significantly shortened.

Further, according to the game scene reproducing as the third embodiment of the present invention, since a collection image clarifying the ranking, the scoring or the results of the members operating a plurality of game machines connected through a network can be formed, the players as the members can enjoy improved entertainingness. Further, rivalry in the respective players is aroused and thus, improved entertainingness can be enjoyed.

What is claimed is:

1. A game scene reproducing machine, comprising:

a reproducing unit for reproducing a game scene of a game machine having an instruction unit for instructing output of the game scene displayed on a display screen while a game is being executed, and outputting game scene reproducing information which includes game history information having timing information of a timing, at which an instruction of the output is instructed by said instruction unit, and control information and manipulation information of the game executed in said game machine; and a receiving unit for receiving the game scene reproducing information outputted from said game machine;

wherein the game scene that is instructed by said instruction unit to be outputted, is reproduced by said reproducing unit in accordance with the game history information received by said receiving unit, and image data of the game scene that has been reproduced, is outputted.

2. The game scene reproducing machine according to claim 1, wherein said reproducing unit executes a game software for reproducing the game scene of the same game as the game that is executed by said game machine so that the game scene that has been instructed to be outputted, is reproduced.

3. The game scene reproducing machine according to claim 1, wherein the image data of the game scene to be outputted is an image data of high definition image than an image data of the game scene that has been displayed on the display screen of the game machine.

4. The game scene reproducing machine according to claim 3, wherein the image data of the high definition image is superior in at least one of spatial resolution, gradation resolution, and a number of drawn polygons as compared with those of the image data of the game screen of said game machine.

5. The game scene reproducing machine according to claim 3, wherein the image data of the high definition image is an image data that has been subjected to the other image processing which is different from image processing executed in said game machine while the game is executed, and wherein the other image processing is at least one of computer graphics technology selected from the group consisting of texture mapping, bump mapping, fogging, alpha rendering, bi-linear filtering, tri-linear filtering, MIP map, anti-aliasing, multi-pass rendering, radio city rendering, ray tracing, fractal, random fractal, fractal noise, cell automaton, Bezier curve, spline curve, NURBS.

6. The game scene reproducing machine according to claim 1, wherein the image data of the game scene to be outputted is an image data subjected to at least one of special finishing processing and reproducing processing from a different view point.

7. The game scene reproducing machine according to claim 1, further comprising:
    an image data converting unit for converting the image data of the game scene that has been reproduced, into an output image data in correspondence with an output format.

8. The game scene reproducing machine according to claim 7, wherein the output format is at least one selected from the group consisting of a print output, recording to an image data recording medium and an image data transfer via a communication network.

9. The game scene reproducing machine according to claim 1, further comprising:
    a comment information addition unit for adding comment information onto the image of the game scene to be outputted.

10. The game scene reproducing machine according to claim 1, wherein the game scene reproducing information includes, in addition to the game history information, at least one selected from the group consisting of order information of the image of the game scene to be outputted, order person identification information and comment information, and
    wherein said game machine outputs, in addition to the game history information, the game scene reproducing information that includes at least one selected form the group consisting of the order information of the image of the game scene to be outputted, the order person identification information, and the comment information.

11. The game scene reproducing machine according to claim 1, wherein the game scene reproducing information that has been outputted by said game machine, is stored to a detachable memory that has been mounted or connected to said game machine, and
    wherein said receiving unit is a unit for reading out the game scene reproducing information from the detachable memory.

12. The game scene reproducing machine according to claim 1, wherein said receiving unit is connected to said game machine, or a memory that is built in, mounted or connected to said game machine via a communication network, wherein said game machine directly outputs the game scene reproducing information to the communication network or outputs the game scene reproducing information to the communication network, after said game machine temporarily stores the game scene reproducing information to the memory that is built in, mounted or connected to said game machine, and wherein said receiving unit receives the game scene reproducing information via the communication network.

13. A game scene reproducing system, comprising:
    a game machine having an instruction unit for instructing output of a game scene displayed on a display screen while a game is being executed, and outputting game scene reproducing information, which includes game history information having timing information of a timing, at which an instruction of the output is instructed by the instruction unit, and control information and manipulation information of the game executed in said game machine;
    a game scene reproducing machine having a reproducing unit for reproducing the game scene of said game machine and a receiving unit for receiving the game scene reproducing information outputted from said game machine, in which the game scene that is instructed by the instruction unit to be outputted, is reproduced by said reproducing unit in accordance with the game history information received by said receiving unit, and image data of the game scene that has been reproduced, is outputted; and
    a communication network in which said game machine and the game scene reproducing machine are connected.

14. The game scene reproducing system according to claim 13, wherein said reproducing unit executes a game software for reproducing the game scene of the same game as the game that is executed by said game machine so that the game scene that has been instructed to be outputted, is reproduced.

15. A game scene reproducing system, comprising:
    a plurality of game machines each having an instruction unit for instructing output of a game scene displayed on a display screen while a game is being executed, and outputting game scene reproducing information which includes game history information having timing information of a timing, at which an instruction of the output is instructed by the instruction unit, and control information and manipulation information of the game executed in said game machine;
    a game scene reproducing machine having a reproducing unit for reproducing the game scene of at least one of said plurality of game machines and a receiving unit for receiving the game scene reproducing information outputted from said at least one of said plurality of game machines, in which the game scene that is instructed by the instruction unit to be outputted, is reproduced by said reproducing unit in accordance with the game history information received by said receiving unit, and image data of the game scene that has been reproduced, is outputted; and
    a communication network in which the plurality of game machines and the game scene reproducing machine are connected,
    wherein said at least one of the plurality of game machines outputs the game scene reproducing information of the game scene instructed by the instruction unit to said receiving unit of the game scene reproducing machine via the communication network.

16. The game scene reproducing system according to claim 15, wherein said reproducing unit executes a game software for reproducing the game scene of the same game as the game that is executed by said game machine so that the game scene that has been instructed to be outputted, is reproduced.

17. The game scene reproducing system according to claim 15, wherein the communication network is an interactive communication network, and wherein the game scene reproducing machine outputs the image data of the game scene that has been reproduced by the game scene reproducing unit, to the plurality of game machines to be displayed on the display screen.

18. The game scene reproducing system according to claim 15, wherein the image data of said game scene that has been reproduced by said game scene reproducing machine is displayed as a reproduced image on said display screen of each of said plurality of game machines that specified members have, and said reproduced image is an assembled image representing at least one of a ranking and scoring of said specified members.

* * * * *